United States Patent
Bhargava et al.

[19]

[11] Patent Number: 5,829,888
[45] Date of Patent: Nov. 3, 1998

[54] THRUST WASHER WITH INTEGRAL RETAINER MEMBERS

[75] Inventors: Piyush Bhargava, Ann Arbor; Anatoly Filanovsky, Farmington Hills, both of Mich.

[73] Assignee: General Motors Corporation, Detroit, Mich.

[21] Appl. No.: 925,256

[22] Filed: Sep. 8, 1997

[51] Int. Cl.⁶ .................................................. F16C 17/04
[52] U.S. Cl. .......................................... 384/420; 384/295
[58] Field of Search .................................. 384/295, 420, 384/421, 422, 423, 425, 427

[56] References Cited

U.S. PATENT DOCUMENTS

| 2,872,256 | 2/1959 | Thomson | 384/420 |
| 5,007,746 | 4/1991 | Matzelle et al. | 384/420 |
| 5,072,707 | 12/1991 | Takai et al. | 384/420 X |
| 5,139,350 | 8/1992 | Gieseler et al. | 384/295 X |

*Primary Examiner*—Thomas R. Hannon
*Attorney, Agent, or Firm*—Donald F. Scherer

[57] ABSTRACT

A thrust has a pair of axially extending positioning and retaining members which align with respective recesses formed in a transmission housing component in which the thrust washer is to be retained. The retaining member has a resilient portion which is deformable to accommodate interference fit with the respective recess thereby retaining the washer in situ. The positioning member provides a locating element and prevents rotational displacement of the washer during assembly of the housing to the transmission.

4 Claims, 2 Drawing Sheets

THRUST WASHER WITH INTEGRAL RETAINER MEMBERS

TECHNICAL FIELD

This invention relates to bearings of the thrust type.

BACKGROUND OF THE INVENTION

Power transmissions generally incorporate a thrust bearing or thrush washer between relatively rotating parts, such as sprockets and housings or torque converters and housings. In these mechanisms, the axial thrust loads are not sufficiently large so as to require a needle bearing or a tapered roller bearing.

One benefit of the use of thrust bearings or washers is the small axial space required. One drawback is the difficulty during assembly.

The thrust washer normally has a drive tang loosely fitted to a slot in one of the adjacent members. Axial retention of the bearing is not present in these assemblies. To provide axial retention, it is known to use a heavy grease compound applied to the bearing prior to assembly. Since the assembly to adjacent components often obscures the thrust bearing during assembly, misalignment can occur occasionally resulting in the need for disassembly and reassembly of the components.

SUMMARY OF THE INVENTION

It is an object of the present invention to provide an improved thrust bearing.

In one aspect of the invention, a thrust bearing is provided with axially extending locating elements, one of which is deformable to retainably engage a recess in a housing.

In another aspect of the invention, the other axially extending locator is fitted loosely in a second recess in the housing.

DESCRIPTION OF AN EXEMPLARY EMBODIMENT

Figure 1:
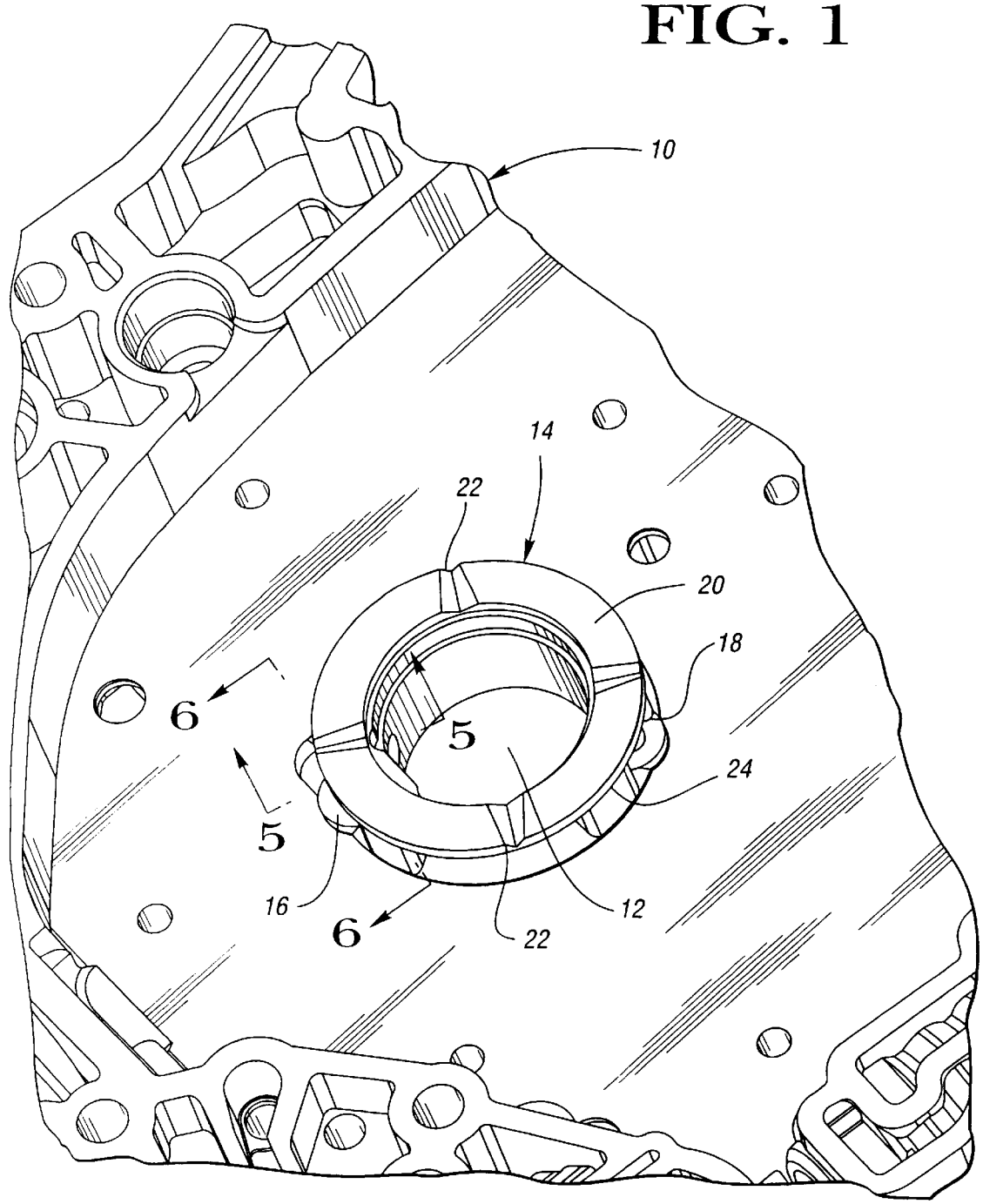
FIG. 1 is an isometric view of a portion of a transmission housing cover with a thrust bearing incorporating the present invention installed.

Referring to the drawings, wherein like characters represent the same or corresponding parts throughout the several views, there is seen in FIG. 1 a transmission housing component 10 which has formed therein a plurality of fluid channels and crevices. The housing 10 is a component in a transmission assembly which covers one end of the transmission and includes an opening 12 through which a transmission shaft, not shown, extends during assembly. The shaft which extends through the opening 12 can have incorporated therewith conventional elements such as a gear, a torque converter or a chain sprocket, not shown. These components will have a flat surface which is disposed to run against a thrust washer or bearing 14 which is secured in recesses 16 and 18 formed in the housing 10.

The thrust washer 14 has a substantially flat bearing surface 20 which has formed therein a plurality of grooves 22. The grooves 22 are effective to retain lubricating oil which will circulate along the bearing surface between the thrust bearing 14 and the mating transmission component.

Figure 2:
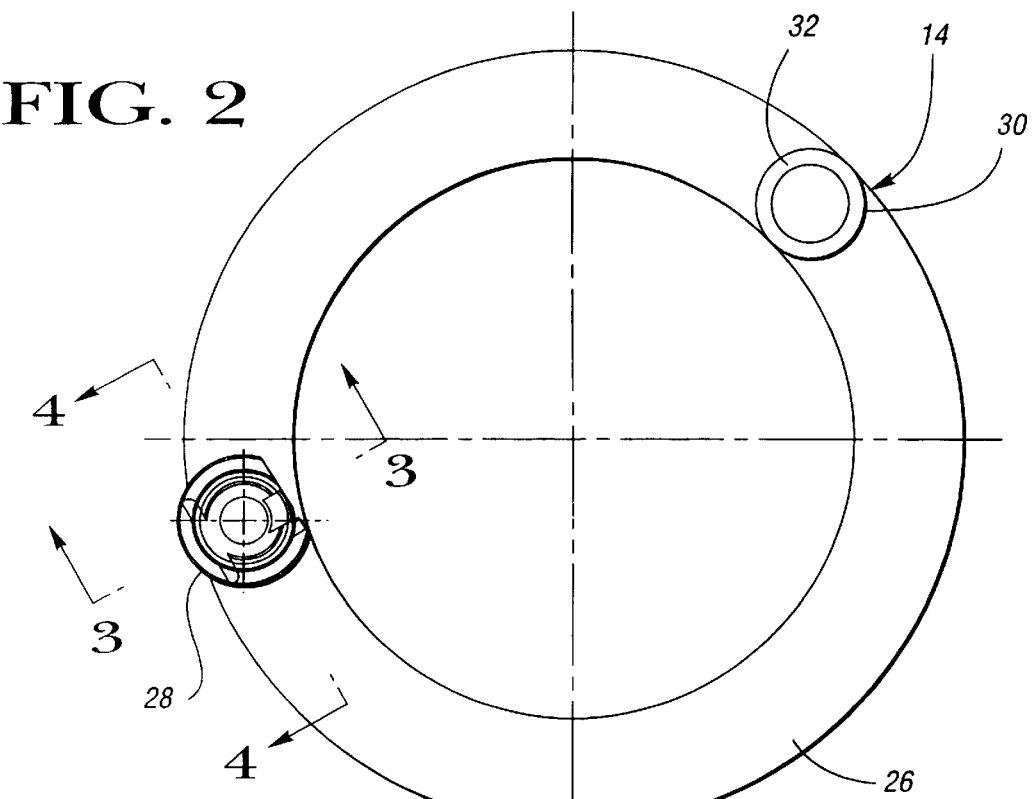
FIG. 2 is a plan view of a thrust bearing incorporating the present invention.
Figure 5:
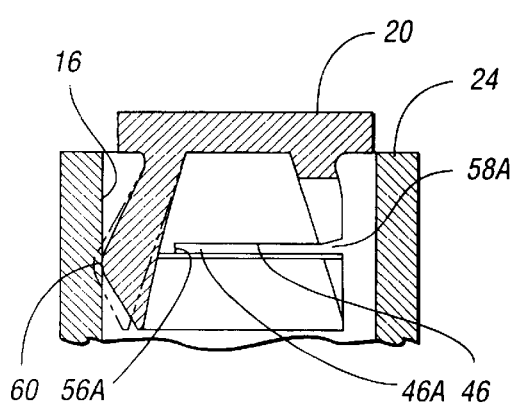
FIG. 5 is a view taken along line 5—5 of FIG. 1.
Figure 6:
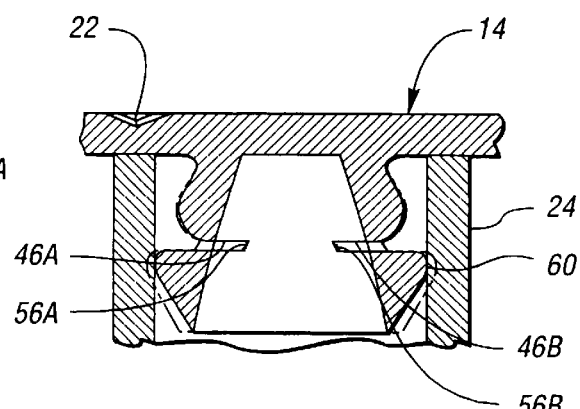
FIG. 6 is a view taken along line 6—6 of FIG. 1.

The housing 10 has a plurality of shelf elements 24 which, as seen in FIGS. 5 and 6, support the thrust bearing 14. As seen in FIG. 2, the thrust bearing 14 has an attachment surface 26 which is substantially parallel to the bearing surface 20. Axially extending from the attachment surface 26 is a retaining or securement member 28 and a locating post or member 30. The retaining member 28 is secured in recess 16 and the locating member 30 is disposed in recess 18. The locating member 30 is a substantially cylindrical element with a beveled end 32 which will assist in guiding the bearing during assembly onto the housing 10.

The retaining member 28 has a first frusto-conical section 34 which is integral with the attachment surface 26. The frusto-conical portion 34 has the frustum 36 adjacent the surface 26 and a base 38 of the frusto-conical portion 34 displaced axially from the surface 26. A second frusto-conical portion 40 is integral with a portion of the frusto-conical 34 and includes a base 42 which is disposed adjacent the portion 34 and a frustum 44 which is axially displaced from the portion 34. The portions 34 and 40 are separated partially by a slot 46 which is further intersected by an axially extending opening 48.

Figure 3:
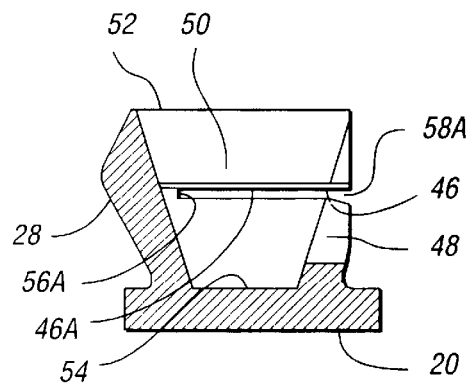
FIG. 3 is a view taken along line 3—3 of FIG. 2.
Figure 4:
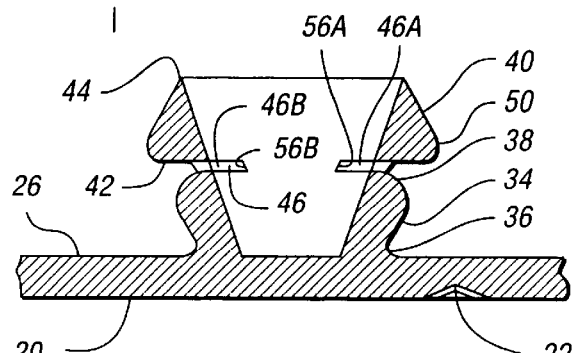
FIG. 4 is a view taken along line 4—4 of FIG. 2.

The member 28 also has formed therein a frusto-conical central opening 50 which has a base 52 juxtaposed the base 42 and a frustum 54 which is substantially disposed at the surface 26. The axial opening 48 subtends the opening 50 to provide a dividing component for the slot 46. With the position of the axial opening 48, the slot 46 is essentially divided into a slot 46A and a slot 46B, each of which has a closed end 56A and 56B, respectively. Each slot 46A and 46B also has an open end of which 58A is seen in FIGS. 3 and 5.

The frusto-conical portion 48 has a bearing wall 60 which will deflect radially inwardly when the bearing 14 is assembled onto the housing 10, such that the member 28 is inserted into the recess 16. This radially inward displacement of the member 28 results in retention of the bearing 14 within the housing 10. The slot 46 and axial opening 48, as well as the opening 50, cooperate to permit the radial inward movement of the frusto-conical portion 40.

The frictional forces formed between the bearing wall 60 and the recess 16 will retain the thrust bearing 14 in the proper location during assembly of the housing 10 onto the remainder of the transmission components. The locating post 30 cooperates to eliminate any rotary movement of the thrust bearing 14 about the retaining member 28 while the housing 10 is being assembled onto the other transmission components.

This structure eliminates the variability of the thrust bearing position during assembly of the housing thereby improving the overall assembly efficiency of the transmission as well as reducing the possibility that the bearing 14 might be damaged during assembly.

We claim:

1. A thrust washer comprising:

an annular member having a bearing surface and an attachment surface substantially parallel with said bearing surface;

a first axially extending locating member integral with said attachment surface including a substantially cylindrical portion adapted to cooperate with a first locating recess in a housing;

a second axially extending locating and securement member integral with said attachment surface including a first substantially frusto-conical portion connected with said attachment surface;

a second substantially frusto-conical portion connected with said first frusto-conical portion, an opening in said first and said second frusto-conical portions and a circumferential slot formed in said second member intermediate said first and said second frusto-conical portions in intersection with said opening, said second frusto-conical portion of said second member being deformable upon insertion into a second locating recess in the housing to locate and secure said thrust washer in the housing.

2. The thrust washer defined in claim 1 further comprising:

a central frusto-conical recess formed interiorly of said second member.

3. A thrust washer comprising:

an annular member having a grooved bearing surface and an attachment surface substantially parallel with said bearing surface;

a first axially extending locating member integral with said attachment surface including a substantially cylindrical portion adapted to cooperate with a first locating recess in a housing;

a second axially extending locating and securement member integral with said attachment surface including a first portion extending axially from said attachment surface;

a substantially frusto-conical portion connected with said first portion, a central recess, an opening in a wall of said frusto-conical portion subtending said central recess and a circumferential slot formed between said first portion and said frusto-conical portion and having two closed ends and two open ends formed in said second member intersecting said opening, said frusto-conical portion being deformable upon insertion into a second locating recess in the housing to locate and secure said thrust washer in the housing.

4. The thrust washer defined in claim 1 further wherein:

said central recess is a frusto-conical recess formed interiorly of said second member.

* * * * *